Feb. 3, 1959  F. LAWN  2,872,635
INVERTER
Filed July 26, 1955  3 Sheets-Sheet 1

INVENTOR.
FRANCIS LAWN
BY
John C. McGregor

Feb. 3, 1959  F. LAWN  2,872,635
INVERTER
Filed July 26, 1955  3 Sheets-Sheet 3

INVENTOR.
FRANCIS LAWN
BY
John C. McGregor

United States Patent Office 2,872,635
Patented Feb. 3, 1959

2,872,635
INVERTER

Francis Lawn, Freehold, N. J., assignor to Lawn Electronics Co. Inc., Freehold, N. J., a corporation of New York Application July 26, 1955, Serial No. 524,329

19 Claims. (Cl. 321—18)

This invention relates to devices for the inversion from direct to alternating current power and more particularly to inverters adapted to utilize gas tubes to convert D. C. power to A. C. power of controlled wave form.

Inversion from direct to alternating current in relatively high power ranges has been achieved using gas tubes such as thyratrons, ignitrons, or the like. The output wave forms, however, have not been satisfactory for all purposes; output voltage regulation and control have been poor; and the firing and extinguishing of the gas tubes has been unreliable. Furthermore, matching of the output impedance has been required, thus limiting the allowable load variation, and low power control of very high output power has not been feasible.

These many disadvantages inhering in inverters of conventional design have been overcome in accordance with the present invention by providing, as part of an inverter circuit, an adjustable control network utilizing supplementary gas tubes to extinguish the power tubes. The control network can be adjusted to extinguish the power tubes cyclically at any time up to the normal completion of their cycles, thereby to control the amplitude as well as the shape of the output wave, which can be sinusoidal, for example, even for high resistance loads. Also, the A. C. output signal can in accordance with the invention be utilized to influence the operation of the control network to achieve good regulation of the output.

Representative embodiments of the invention from which the above and other features will be apparent are described below having reference to the accompanying drawings in which.

Figure 1:
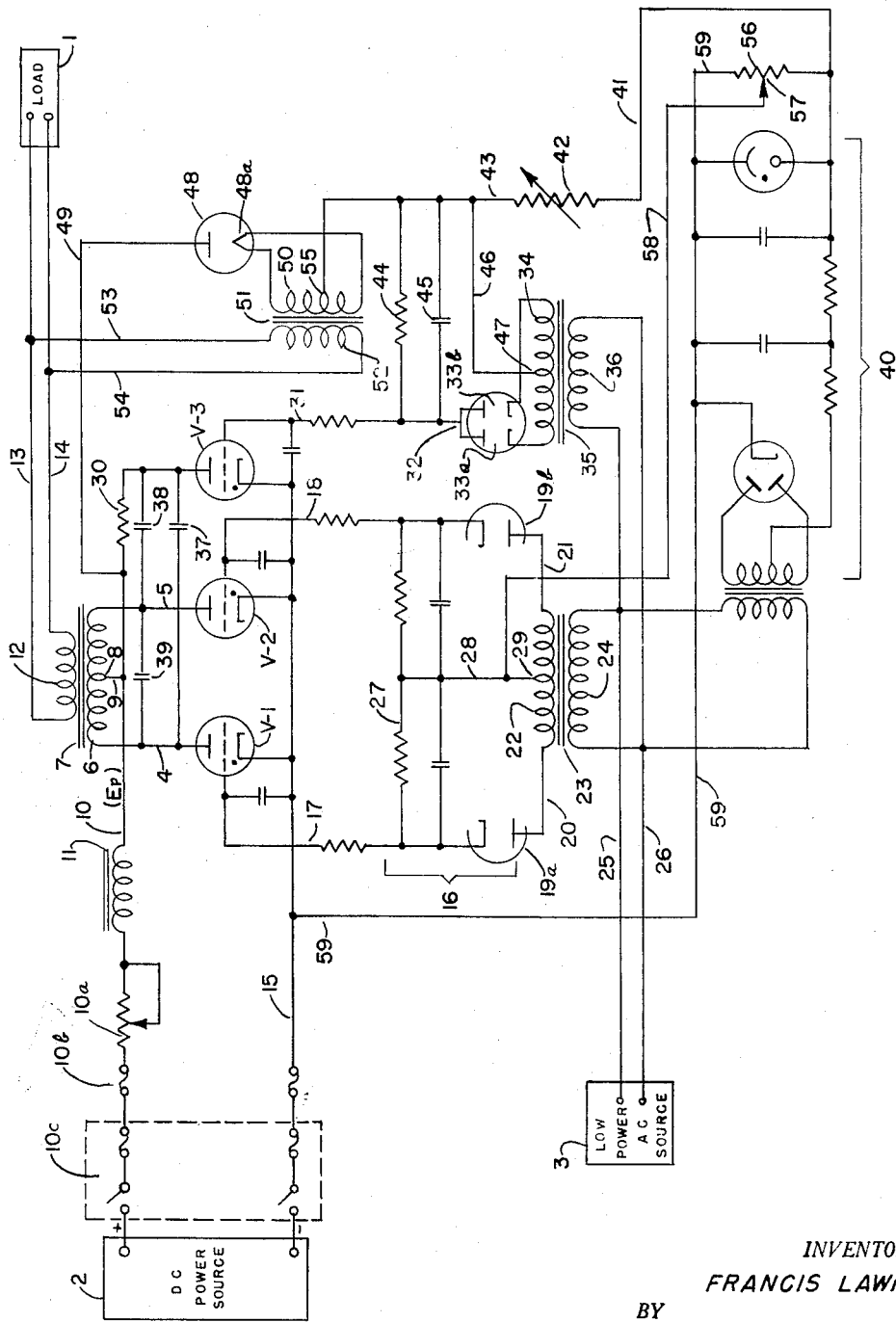
Figure 1 is a schematic diagram of an inverter formed in accordance with the present invention and showing grid voltage control means for both power and control gas tubes.

Referring to Figure 1, there is shown a parallel-type, single-phase inverter using gas tubes V-1 and V-2 which serve as the power tubes and which can take the form for example of conventional thyratrons, ignitrons, or the like. The power gas tubes V-1 and V-2 are arranged, as described below, to operate under the control of a control gas tube V-3 to deliver A. C. power to a load 1 from a D. C. power source 2. The illustrated inverter circuit is controlled by an A. C. source 3, which can be of very low power.

The plate electrodes of the gas tubes V-1 and V-2 are connected by conductors 4 and 5, respectively, to opposite ends of a primary winding 6 of an output transformer 7, representing the load thereon as reflected from the load 1 through the transformer. The primary winding 6 has a midtap 8 connected by conductors 9 and 10 to the positive terminal of the D. C. source through a circuit which includes impedance means such as a choke 11 and such conventional devices as a voltage controlling rheostat 10a, fuse means 10b, and an overload circuit breaker 10c. The load 1 is connected across a secondary winding 12 of the output transformer 7 by conductors 13 and 14.

The cathode electrodes of the tubes V-1 and V-2 are connected by a conductor 15 to the negative terminal of the D. C. source and the grid electrodes are connected to a firing or grid voltage controlling circuit indicated generally by the numeral 16 through conductors 17 and 18, respectively. The firing circuit includes a pair of diodes 19a and 19b the cathode electrodes of which are respectively connected by the conductors 17 and 18 to the grid electrodes of the gas tubes V-1 and V-2. The plate electrodes of the diodes 19a and 19b are connected by conductors 20 and 21, respectively to opposite ends of a secondary winding 22 of a transformer 23, the primary winding 24 of which is connected across the low power A. C. source 3 by conductors 25 and 26. The cathode electrodes of the diodes 19a and 19b are tied together by a balanced resistance network indicated generally by the numeral 27 joined at its center by a conductor 28 to a midtap 29 on the primary winding 22 of the transformer 23. The firing circuit 16 operates to impress firing voltages alternately and at 180° intervals, with respect to the wave form of the low power A. C. control source 3, on the grid electrodes of the gas tubes V-1 and V-2 to fire them.

The control gas tube V-3 has its plate electrode connected through an impedance means 30 and the conductor 10 to the positive terminal of the D. C. power source 2 and its grid electrode connected by the conductor 31 to firing or grid voltage control means indicated generally by the numeral 32 including a pair of diodes 33a and 33b the plate electrodes of which are both tied to the conductor 31 and the cathode electrodes of which are connected to opposite ends of a secondary winding 34 of a transformer 35, the primary winding 36 of which is connected by the conductors 25 and 26 to the low power A. C. source 3.

The operation of the firing means 32 is such that the control gas tube V-3 is fired once for each firing of either of the power tubes V-1 and V-2, this by virtue of the common connection between the plate electrodes of the diodes 33a and 33b to the control grid electrode of the tube V-3. The system is so arranged, however, that the tube V-3 is fired at a predetermined time interval, measured on the wave of the A. C. source, after the firing of a power tube. In a representative arrangement, the tube V-3 is fired 150° after the firing of each power tube.

To extinguish the gas tubes, the plate electrodes of the control tube V-3 and the power tubes V-1 and V-2 are cross connected through commutating means which can take the form of a capacitor 37 connected between the plate electrodes of the tubes V-1 and V-3, a capacitor 38 connected between the plate electrodes of the tubes V-2 and V-3 and, preferably, although not necessarily, a capacitor 39 connected between the plate electrodes of the tubes V-1 and V-2. By means of these connections, the firing of the control tube V-3 extinguishes whichever of the power tubes V-1 or V-2 happens to be firing, and conversely when either one of the power tubes V-1 or V-2 is fired it is able to extinguish the control tube V-3. The extinguishing action as between the control and power tubes is brought about by the capacitors 37 and 38, with the capacitor 39 serving as a safety device to enable one power tube to extinguish the other in the event the control tube for any reason fails to do so previously.

In operation, with a D. C. voltage $E_p$ applied on the plate electrodes of the three tubes V-1, V-2 and V-3 equally, no voltage appears across the commutating capacitors 37, 38 and 39. When the grid electrode of the tube V-1 is pulsed from the grid source 16, the tube V-1 fires, causing the voltage on its plate electrode to drop toward zero, stabilizing at a positive value of say 8 volts occasioned by the tube drop. The voltages on the plate electrodes of the tubes V-2 and V-3 will, therefore, be caused to drop to 8 volts due to the inability of the capacitors 37 and 38 to charge instantaneously. The plate electrode of the tube V-1 will remain at 8 volts as long as the tube is conducting, but the voltages on the plate electrodes of the tubes V-2 and V-3 will increase, the rate of increase for the tube V-2 being determined by the values of the choke 11, the capacitors 37, 38 and 39 and the load 1, and the rate of increas of voltage on the plate electrode of the tube V-3 being determined by the value of the choke 11, the impedance means 30 and the capacitors 37, 38 and 39. While the tube V-1 is conducting the voltage on the plate electrode of the tube V-2 will approach $2E_p-8$ volts because the center tapped primary transformer winding 6 must have equal voltages in its two halves, and the voltage on the plate electrode of the tube V-3 will approach $E_p$.

Before the completion of a complete half cycle or 180° of the output wave form, the tube V-3 is fired by the source 32 causing its plate voltage to drop to 8 volts. At this instant, because the voltage across the capacitors 37, 38 and 39 cannot change instantaneously, the voltage on the plate electrode of the tube V-1 drops to the negative value of $E_p-8$ volts extinguishing the tube. The voltage on the plate electrode of the tube V-2 drops to $E_p$. The voltage on the plate electrode of the tube V-3 will remain at 8 volts as long as the tube is conducting while the voltages on the plate electrodes of the tubes V-1 and V-2 will increase.

The tubes can be arranged to fire in the above sequence, i. e., V-1, V-3, V-2, V-3, V-1, V-3, and so on. The output voltage will be a function of the D. C. input voltage from the source 2, the impedance of the load 1 and the number of degrees that the control tube V-3 permits the power tubes V-1 and V-2 to conduct.

In order to control the firing time of the control tube V-3, the firing or grid voltage control means 32 thereof can be connected through a control network including a D. C. source which can take the form of a regulated D. C. power supply 40 powered, for example, from the A. C. source 3 and the positive D. C. output which is connected through a conductor 41, a rheostat 42, a conductor 43 and a resistor 44 to the conductor 31 which connects to the grid electrode of the gas tube V-3. A capacitor 45 is connected across the resistor 44 and a conductor 46 is connected between the conductor 43 and a midtap 47 of the secondary winding 34 of the transformer 35 in the cathode circuit of the diodes 33a and 33b.

A temperature limited diode 48 is connected with its plate electrode tied by a conductor 49 to the conductor 10 leading to the D. C. power source 2. The common cathode and heater 48a of the diode 48 are connected across a secondary winding 50 of a transformer 51 the primary winding 52 of which is connected across the secondary winding 12 of the output transformer 7 by means of conductors 53 and 54 which connect respectively to the conductors 13 and 14 to the load 1. The secondary winding has a center tap 55 to which the conductor 43 from the rheostat 42 is connected.

The regulated D. C. power supply 40 has connected across its output terminal a potentiometer 56, the movable contact 57 of which is connected by a conductor 58 to the center tap 29 of the secondary winding 22 of the transformer 23 in the plate circuits of the diodes 19a and 19b. It will be observed that the cathode and heater 48a of the temperature limited diode 48 find a connection to the negative side of the D. C. power source through a circuit including half of the secondary transformer winding 50, the center tap 55, conductor 43, rheostat 42, conductor 41, the resistor of the rheostat 56, a conductor 59 and the conductor 15.

Figure 4:
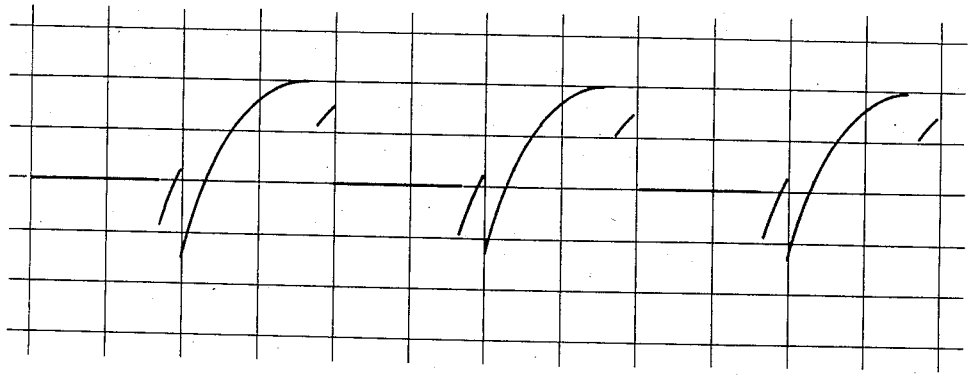
Figure 4 is a diagram of wave shape which can be achieved on the plate electrode of a power tube of the inverter of Figure 1.
Figure 5:
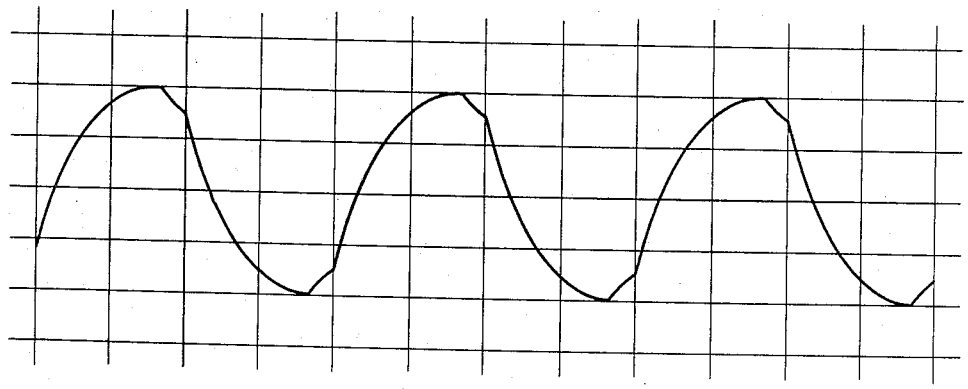
Figure 5 is a diagram of a wave form which can be achieved by the inverter of Figure 1 under relatively heavy resistance load characteristics.

Referring to Figure 4, there is shown the wave form on either of the plates of the tubes V-1 or V-2. The curve 60, which extends over a range of approximately 150° of the A. C. cycle of the source 3, represents the period of firing of a power gas tube V-1 or V-2, the remaining 30° of the cycle being the period of firing of the control tube V-3. It will be recalled that upon firing of the control tube, either power tube V-1 or V-2, whichever is conducting, is extinguished through the commutating capacitor 37 or 38. The control tube V-3 is then extinguished at the end of its 30° cycle of operation by the firing of the next power tube, also by the capacitor 37 or 38. The output wave form which appears across the load is indicated in Figure 5. It will be observed that the curve of Figure 5 approaches sinusoidal form notwithstanding a heavy resistance load.

The rheostat 42 can be used to control the output voltage on the load through the temperature limited diode 48 and the firing or grid voltage control means 32 for the control gas tube V-3. In operation, the appearance of an A. C. output signal across the load 1 induces a current flow in the secondary winding 50 of the transformer 51 directly proportional to its magnitude, thereby establishing a rate of emission for the cathode and heater 48a which varies directly with the output signal. The diode 48 conducts, therefore, in direct proportion to the magnitude of the output signal and establishes a flow of current from the negative side of the D. C. source 2 through conductors 15, 59 and 41, via the resistor 56, and through the resistor of the rheostat 42. The circuit, including the resistor 44, the capacitor 45, the diodes 33a and 33b, and the transformer 35, is a wave-shaping circuit which produces a saw-tooth wave form at twice the frequency of operation of the system. This wave is applied to the grid of the thyratron V-3. The thyratron is made to fire at any point on the rising slope of the saw-tooth wave by varying the potential between the resistors 42 and 44. The latter potential varies with the flow of current through the resistor 42, this current being determined by the filament voltage of the temperature-limited diode 48. This current is, as stated, a function of the output voltage. An increase in output voltage will, therefore, raise the potential of the wave-shaping circuit so that the saw-tooth wave intersects the critical grid voltage of the thyratron V-3 earlier in phase, firing the thyratron earlier to limit the number of degrees through which either of the power thyratrons V-1 or V-2 conduct. Since the output voltage is a function of the conducting time of the thyratrons V-1 and V-2, the output voltage will decrease when the conducting period decreases.

Figure 2:
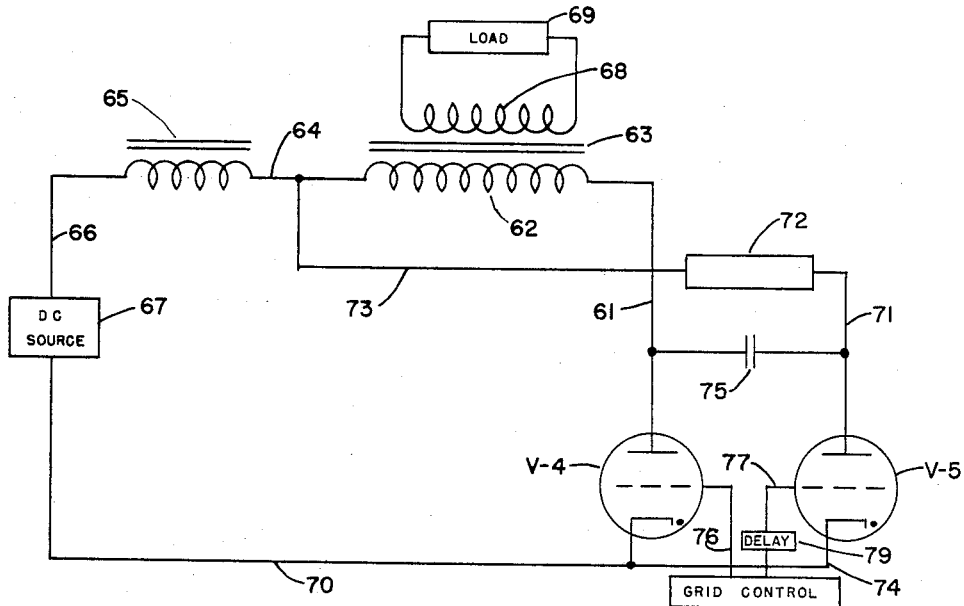
Figure 2 is a schematic diagram of a modification of the inverter of Figure 1.

Referring to Figure 2, there is shown an arrangement by means of which the principle of the present invention is applied to a single ended output transformer using a single driving or power tube and a single control tube. The plate electrode of a gas tube V-4 which is the power tube in the circuit, is connected by a conductor 61 to one end of a primary winding 62 of an output transformer 63, the other end of the primary winding being connected by a conductor 64, filter means, which can take the form of a choke 65, and a conductor 66 to the positive terminal of a D. C. energizing source 67. The output transformer 63 includes a secondary winding 68 across which a load 69 is connected. The cathode electrode of the tube V-4 is connected by conductor 70 to the negative terminal of the D. C. source 67.

A second gas tube V-5, which is the control tube, has its plate electrode connected to the D. C. source 67 through a series circuit including a conductor 71, impedance means 72, a conductor 73, the conductor 64, the filter means 65 and the conductor 66. The cathode electrode of the control tube V-5 is connected to the negative side of the source 67 through a circuit including a conductor 74 and the conductor 70.

The plate electrodes of the two tubes V-4 and V-5 are tied together through a commutating capacitor 75 and the control grid electrodes are connected by conductors 76 and 77, respectively, to a source of grid control voltage 78 for firing the tubes V-4 and V-5 cyclically and successively. A suitable time delay circuit 79 corresponding for example to the circuits including the diodes 33a, 33b and 48 of Figure 1, is provided in connections to the grid electrode of the tube V-5.

In operation, the tube V-4 is fired cyclically over time intervals determined by the time constant afforded by the filter inductance 65, the capacitor 75 and the load 69 as reflected through the transformer 63, while the tube V-5 is fired alternately to the tube V-4 to extinguish the latter at a pre-established point in its cycle, say after 150° of operation.

Figure 3:
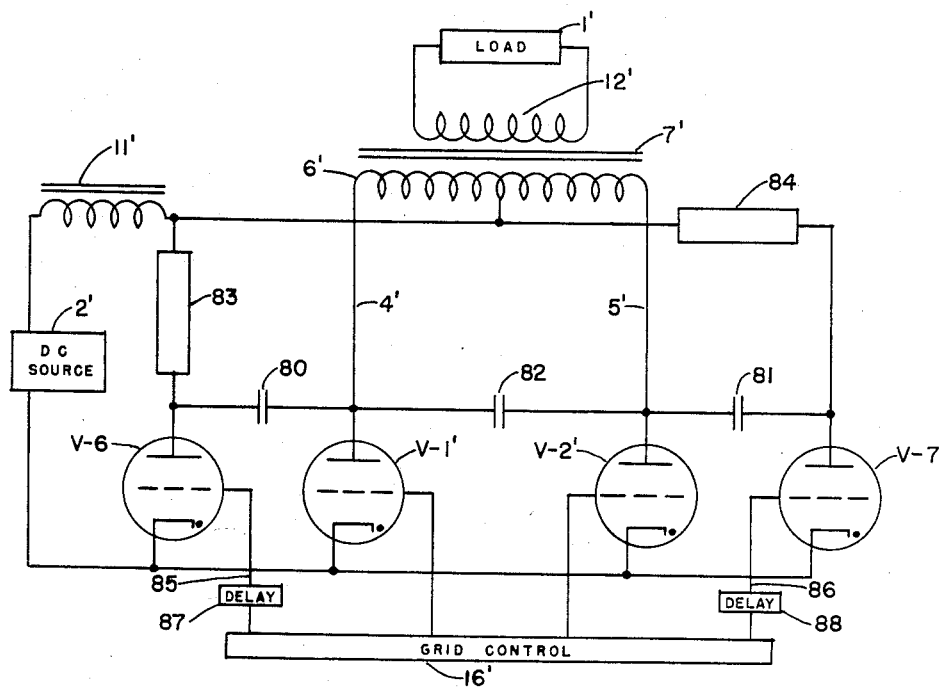
Figure 3 is a schematic diagram of another modification of the inverter of Figure 1.

If desired, the arrangement of Figure 1 can be modified as illustrated by Figure 3 to provide a separate control tube for each power tube. In Figure 3, parts corresponding identically to those of Figure 1 are identified by like primed reference numerals, the power tube V-1' being provided with a control tube V-6 and the power tube V-2' being provided with a control tube V-7. Connected across the plate electrodes of the tubes V-1' and V-6 is a commutating capacitor 80 and connected across the plate electrodes of the tubes V-2' and V-7 is a commutating capacitor 81. A third commutating capacitor 82 is connected across the plate electrodes of the power tubes V-1' and V-2'.

The plate electrodes of the tubes V-6 and V-7 can both be connected to the D. C. source 2' through the filter means 11' and, respectively, through the impedance means 83 and 84. The grid electrodes of the tubes V-6 and V-7 are connected respectively to the grid control voltage source 16' through conductors 85 and 86, respectively, including suitable time delay means 87 and 88, each of which can correspond to the circuits including the diodes 33a, 33b and 48 of Figure 1.

Operation of this circuit is substantially the same as that of Figure 1, described above, with the exception that the grid voltage source is arranged to fire the tubes in the order V-1', V-6, V-2', V-7. The wave form across the load is again shown by Figure 5 and the wave form on the plate electrodes of the power tubes V-1' and V-2' is again shown by Figure 4.

It will be understood, therefore, that the various forms and arrangements of the basic circuitry can be provided without departing from the scope of the present invention which should not be limited except as defined by the following claims.

I claim:

1. In an inverter, at least two gas tubes, commutating means connected between the tubes to cause the firing of one to extinguish the other, means to connect a load to one tube, said one tube comprising a power tube, means to energize said one tube from a D. C. source through the load, means independent of the load to energize the other tube from a D. C. source, said other tube comprising a control tube, means to fire the two tubes cyclically at different times comprising a comon source of firing control signals for both of said tubes, by delay means connected in series between said source and said control tube, and means to adjust the delay interval of said time delay means to adjust the relative firing times of the two tubes to control the output signal across the load.

2. In an inverter, at least two gas tubes, commutating means connected between the tubes to cause the firing of one to extinguish the other, means to connect a load to one tube, said one tube comprising a power tube, means to energize said one tube from a D. C. source through the load, means independent of the load to energize the other tube from a D. C. source, said other tube comprising a control tube, means to fire the two tubes cyclically at different times comprising a common source of firing control signals for both of said tubes, by delay means connected in series between said source and said control tube, and means responsive to the output of said one tube to control said time delay means to control the relative firing time of said other tube.

3. In an inverter, first and second power output gas tubes, control gas tube means, first and second commutating capacitor means connected respectively between the control tube means and the first power tube and between the control tube means and the second power tube to cause the firing of the control tube means to extinguish whichever power tube is firing, means to connect a load across the power tubes, means to energize the power tubes from a D. C. source through the load, means to fire the power tubes cyclically and alternately, means to energize the control tube means, and means to fire the control tube means cyclically in timed relation to the firing of the power tubes to extinguish one power tube before the other is fired.

4. An inverter as set forth in claim 3 including inductance means common to said means to energize the power and control tube means.

5. An inverter as set forth in claim 3, including means to adjust the relative firing times as between the control gas tube means and the power gas tubes, thereby to control the output power.

6. An inverter as set forth in claim 3, including means responsive to the output of the power gas tubes to control the firing times of the control gas tube means relative to the respective firing times of the power gas tubes.

7. An inverter as set forth in claim 3, said load including an output transformer having a primary winding, and means to connect opposite ends of the winding respectively to the first and second power tubes, said means to energize the power tubes being connected to the midpoint of said primary winding, said control gas tube being adapted to be connected to the D. C. source independently of the primary winding.

8. An inverter as set forth in claim 3, said control gas tube means including one gas tube connected by said commutating means to each of the power gas tubes.

9. An inverter as set forth in claim 3, said control gas tube means including first and second control gas tubes connected respectively by said commutating means to the first and second power tubes.

10. An inverter as set forth in claim 3, said means to fire the control tube means comprising a pair of diodes each having one electrode connected to the control tube means, and means to connect an A. C. control source across the other electrodes of the diodes.

11. An inverter as set forth in claim 3, said means to fire the control gas tube means comprising a pair of diodes each having one electrode connected to a control electrode of the control gas tube, means to connect other electrodes of the diodes to receive opposite polarities of an A. C. source, a D. C. source to energize the diodes, and means to adjust the D. C. source to vary the firing times of the diodes relative to the A. C. control signal.

12. An inverter as set forth in claim 6, said means responsive to the output of the power gas tubes comprising a temperature limited diode having cathode heater means connected across the load, means to connect a D. C. power source across the diode, and means responsive to firing of the diode to control the firing time of the control gas tube means.

13. An inverter as set forth in claim 12, said means to control the firing time of the control gas tube means comprising a rheostat in series with said D. C. power source for the temperature limited diode, a pair of diodes each having one electrode connected to the D. C. source through the rheostat, and means to connect the other electrodes of the diodes across an A. C. source, whereby a change in the output of the power gas tubes or a change in the resistance value of the rheostat changes the firing time of the control gas tube means relative the firing of the power gas tubes.

14. In an inverter, a first gas tube having plate, control grid and cathode electrodes, first plate and cathode circuit means to connect a voltage source across the plate and cathode electrodes, said circuit means including, in series, inductance means and the primary winding of an output transformer, a second gas tube having plate, control grid and cathode electrodes, second plate and cathode circuit means to connect a voltage source across the plate and cathode electrodes of the second gas tube, the last said circuit means including said inductance means but bypassing the output transformer, commutating capacitor means connected between the plate electrodes of the first and second tubes, and means to impress tube firing voltages on the control grid electrodes of the first and second tubes cyclically in timed relation, comprising a common source of firing control voltages, and time delay means connected in series with the control grid electrode of said second tube.

15. An inverter comprising first and second gas tubes each having plate, control grid and cathode electrodes, an output transformer having a primary winding the opposite ends of which are connected, respectively, to the plate electrodes of the first and second tubes, means including an inductance to connect a positive D. C. potential to the midpoint of said primary winding and means to connect the negative terminal of said source to the cathode electrodes of the first and second tubes, said output transformer having a secondary winding adapted to have a load connected thereacross, third gas tube means having plate, control grid and cathode electrodes, means bypassing said primary winding but including said inductance to connect the positive terminal of a source of D. C. potential to the plate electrode of the third tube and means to connect the negative terminal of said source to the cathode electrode thereof, a first commutating capacitor connected between the plate electrodes of the first and third tubes and a second commutating capacitor connected between the plate electrodes of the second and third tubes, means to impress firing voltages sequentially and cyclically on the control grid electrodes of said tubes, and means to control the timing of the last said means to vary the relative firing times of the tubes.

16. An inverter as set forth in claim 14, including means to adjust the delay of said time delay means to adjust the relative firing times of the two tubes, thereby to control the output signal impressed across the load.

17. An inverter as set forth in claim 16, said common source of firing voltages comprising an A. C. signal source, said time delay means comprising diode means having one of its electrodes connected to said A. C. signal source and having its other electrode connected to said control grid electrode of the second tube, and means to connect a control biasing voltage across said diode to control the period during which the diode conducts with respect to said A. C. signal source.

18. An inverter as set forth in claim 17 including means responsive to the output of said first tube to control the biasing voltage across said diode.

19. An inverter as set forth in claim 18, said means responsive to the output of the first tube to control the biasing voltage comprising a temperature limited diode having cathode heater means connected across the output of said first tube, and means to connect said biasing voltage means in series with said temperatures limited diode.

References Cited in the file of this patent

UNITED STATES PATENTS

| | | |
|---|---|---|
| 1,691,395 | Langmuir | Nov. 13, 1928 |
| 1,954,028 | Stansbury | Apr. 10, 1934 |
| 2,005,458 | Eriksson et al. | June 18, 1935 |
| 2,024,173 | Langmuir | Dec. 17, 1935 |